(12) United States Patent
Kim

(10) Patent No.: US 6,956,625 B2
(45) Date of Patent: Oct. 18, 2005

(54) IMAGE PROCESSING APPARATUS AND METHOD FOR REALIZING PANORAMA/WATERGLASS FUNCTIONS

(75) Inventor: Jong-dae Kim, Seoul (KR)

(73) Assignee: Samsung Electronics, Co., Ltd (KR)

( * ) Notice: Subject to any disclaimer, the term of this patent is extended or adjusted under 35 U.S.C. 154(b) by 508 days.

(21) Appl. No.: 10/117,873

(22) Filed: Apr. 8, 2002

(65) Prior Publication Data

US 2003/0086026 A1 May 8, 2003

(30) Foreign Application Priority Data

Jul. 20, 2001 (KR) .................................... 2001-43788

(51) Int. Cl.[7] ............................ H04N 3/22; H04N 3/26
(52) U.S. Cl. ...................... 348/806; 348/445; 348/556; 348/562; 348/580; 345/660; 345/667; 345/668; 382/264; 382/265; 382/279; 382/276
(58) Field of Search ............................. 348/580–582, 348/445, 556, 562, 913; 345/660, 667–668; 382/298–300, 264–265, 279; H04N 3/22, 3/26

(56) References Cited

U.S. PATENT DOCUMENTS

| | | | | | |
|---|---|---|---|---|---|
| 5,648,820 A | * | 7/1997 | Naka et al. | ................. | 348/445 |
| 5,673,086 A | * | 9/1997 | Fukuoka et al. | ............ | 348/445 |
| 5,677,737 A | * | 10/1997 | den Hollander | ............ | 348/445 |
| 5,677,738 A | * | 10/1997 | Mizutani et al. | ............ | 348/458 |
| 5,793,434 A | * | 8/1998 | Lee | .............................. | 348/445 |
| 5,801,772 A | * | 9/1998 | Asaida et al. | ............ | 348/222.1 |
| 5,856,849 A | * | 1/1999 | Aihara | ........................ | 348/445 |
| 5,881,179 A | * | 3/1999 | Gillard | ....................... | 382/261 |
| 6,404,458 B1 | * | 6/2002 | Kang | ......................... | 348/445 |
| 6,614,474 B1 | * | 9/2003 | Malkin et al. | .............. | 348/252 |
| 6,774,952 B1 | * | 8/2004 | Ratcliffe | ..................... | 348/581 |
| 6,806,914 B1 | * | 10/2004 | Onagawa | .................... | 348/581 |
| 2002/0033900 A1 | * | 3/2002 | Honma et al. | .............. | 348/581 |

* cited by examiner

Primary Examiner—Brian P. Yenke
(74) Attorney, Agent, or Firm—Mills & Onello LLP

(57) ABSTRACT

An image processing apparatus and method for realizing panorama/waterglass functions, which are capable of reducing the size of a memory and simplifying memory control, are provided. In order to write a plurality of consecutive pixel data into memory devices, and simultaneously to read the plurality of consecutive pixel data from memory devices, the consecutive pixel data are separated into a plurality of first-in first-out (FIFO) buffers having a small size, thereby minimizing the size of a memory. Further, an identical clock signal is used, and the separated FIFOs are used when the consecutive pixel data are written to the memory devices and read from the memory devices, thereby simplifying memory control such as address control. Further, when realizing panorama/waterglass functions, the scaling ratio function is variably set, thereby variably realizing memories having sizes which vary according to the scaling ratio function.

18 Claims, 7 Drawing Sheets

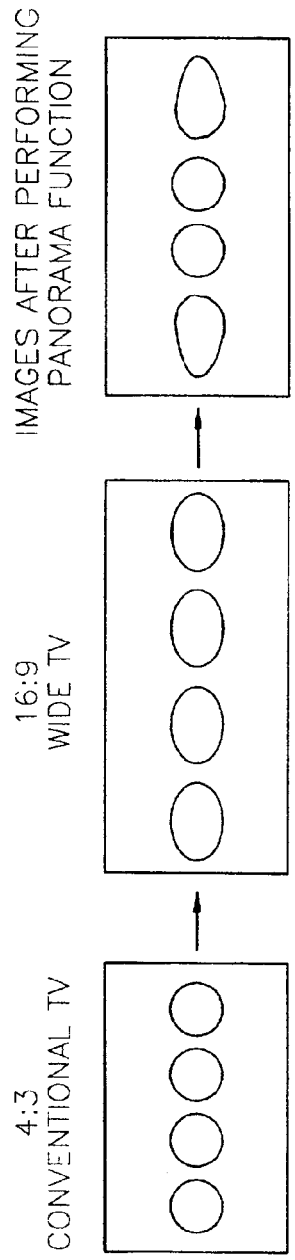
FIG. 1A (PRIOR ART)
4:3 CONVENTIONAL TV
FIG. 1B (PRIOR ART)
16:9 WIDE TV
FIG. 1C (PRIOR ART)
IMAGES AFTER PERFORMING PANORAMA FUNCTION
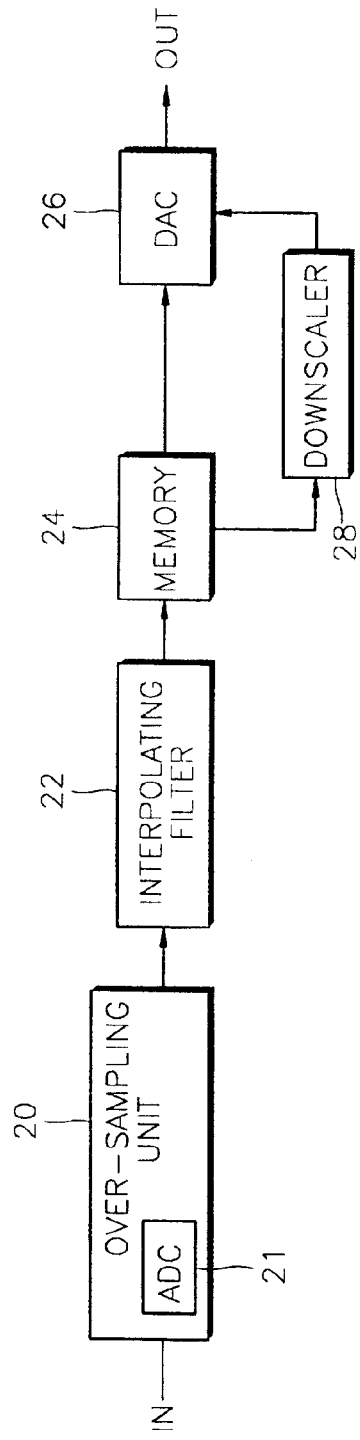
FIG. 2 (PRIOR ART)

IMAGE PROCESSING APPARATUS AND METHOD FOR REALIZING PANORAMA/WATERGLASS FUNCTIONS

BACKGROUND OF THE INVENTION

1. Field of the Invention

The present invention relates to an image processing system, and more particularly, to an image processing apparatus for realizing panorama/waterglass functions and a method thereof.

2. Description of the Related Art

In general, if television signals having a horizontal vertical screen ratio of 4:3 are viewed on a wide television having a horizontal vertical screen ratio of 16:9, due to a visual difference caused by the difference in screen ratios, image signals appear to be stretched in the horizontal direction. Similarly, if wide television signals are viewed on a conventional television, due to a difference in screen ratios, image signals appear to be compressed in the horizontal direction. In order to remove these phenomena, panorama and waterglass functions are realized in an image processing system of each television such that the screen appears normal.

FIGS. 1A through 1C illustrate the variation in image signals when realizing a conventional panorama function. FIG. 1A illustrates conventional TV signals having a screen ratio of 4:3, FIG. 1B illustrates wide TV signals having a screen ratio of 16:9, and FIG. 1C illustrates image signals after performing a panorama function.

A panorama function is used to view conventional television signals through a wide television. If the conventional TV signals shown in FIG. 1A are viewed through a wide TV, as shown in FIG. 1B, the conventional TV signals appear to be stretched in the horizontal direction. To try and remedy this problem, a panorama function for the conventional TV signals is realized, as shown in FIG. 1C. Using the panorama function, the middle of the screen is reduced to the ratio of 4:3 so that the image signals shown in FIG. 1C appear normal. Further, the scaling ratio of the image signals at the edges of the screen increases in compensation for the reduced ratio, and thus, distortion effects increase.

In contrast, on the basis of a waterglass function, in order to prevent a phenomenon in which a screen appears to be compressed in the horizontal direction when wide TV signals are viewed on a conventional TV, the middle of the screen is increased to the ratio of 3:4, and both edges of the screen are reduced so that the screen appears normal.

However, a conventional image processing apparatus for realizing panorama and waterglass functions has drawbacks in which a memory size increases, or a method for controlling a memory becomes complicated.

FIG. 2 is a block diagram of a conventional image processing apparatus for realizing a panorama function. The conventional image processing apparatus includes an over-sampling unit 20 including an analog to digital converter (ADC) 21, an interpolating filter 22, a memory 24, a downscaler 28, and a digital-to-analog converter (DAC) 26.

The over-sampling unit 20 converts input image signals into digital signals and over-samples the converted signals at a predetermined ratio. The over-sampled image signals are interpolated by the interpolating filter 22 and the interpolated result is stored in the memory 24. Data stored in the memory 24 are input to the downscaler 28, and thus, the scaling ratio of the input image signals is reduced to a predetermined ratio at each horizontal interval. Likewise, the image processing apparatus shown in FIG. 2 uses a method for gradually reducing the scaling ratio in a state where input data are previously over-sampled.

However, the image processing apparatus shown in FIG. 2 stores data over-sampled at a predetermined ratio in the memory 24, and thus, the size of the memory increases. For example, when one line is 720 bytes, the size of the memory has a capacity corresponding to one line×2(data for luminance and color signals)×over-sampling ratio.

FIG. 3 is another block diagram of a conventional image processing apparatus for realizing panorama and waterglass functions. The conventional image processing apparatus includes an analog-to-digital converter (ADC) 300, an image memory 310, a ID flip-flop 320, a digital-to-analog converter (DAC) 330, a first phase locked loop (PLL) 340, a second PLL 350, a switching unit 360, first through third divided clock generation units 380a~380c, and a microcomputer (MICOM) 370.

Referring to FIG. 3, the MICOM 370 generates a write enabling signal WENA for writing data into the image memory 310, and a read enabling signal RENA. The first PLL 340 generates a sampling clock signal CLK1 and a write clock signal WCK. The image processing apparatus shown in FIG. 3 generates a variable clock signal for reading data from the image memory 310 so as to satisfy the scaling ratio at each horizontal interval of an image signal. This operation is performed in the first through third divided clock generation units 380a~380c and the switching unit 360. That is, the switching unit 360 is controlled by control of the MICOM 370, and thus, a division clock signal having an appropriate division ratio is selected as a read clock signal and applied to the image memory 310. Thus, data stored in the image memory 310 are read by a variable clock signal according to the scaling ratio.

However, in a method for varying a read clock signal, it is very difficult to realize a clock signal which is precisely switched. Further, each switched interval is stepwise classified, and the scaling ratio of a clock signal may be nonlinearly expressed. Thus, in order to obtain the linearity of the scaling ratio of a clock signal, many clock dividers are required. In this way, in the image processing apparatus shown in FIG. 3, a variable clock signal is used when data are read from the image memory 310, and thus, a method for controlling a memory becomes very complicated.

SUMMARY OF THE INVENTION

To solve the above problems, it is a first objective of the present invention to provide an image processing apparatus for realizing panorama/waterglass functions which is capable of reducing the size of a memory and simultaneously simplifying memory control.

It is a second objective of the present invention to provide a method for realizing panorama/waterglass functions used by the image processing apparatus for realizing panorama/waterglass functions.

In accordance with the invention, there is provided an image processing apparatus for realizing panorama/waterglass functions. The apparatus includes a scaling ratio generating unit, an address generating unit, a luminance signal processing unit, a color signal processing unit, a luminance interpolating filter, and a color signal interpolating filter. The scaling ratio generating unit generates a horizontal scaling ratio function for realizing panorama/waterglass functions in response to variables including an externally applied starting ratio data, ending ratio data, and ratio declination data and determines a position to be interpolated in response to the scaling ratio function. The address generating unit generates luminance write/read addresses and color signal write/read addresses by using the scaling ratio function and the position to be interpolated and generates a pixel offset in response to the luminance read address and the color signal read address. The luminance signal processing unit includes a first memory comprised of a plurality of separate memory devices, writes a plurality of consecutive pixel data among the luminance signals input by the luminance write address into each of the memory devices, and reads the plurality of consecutive pixel data from each of the memory devices on the basis of the position to be interpolated by the luminance read address. The color signal processing unit includes a second memory comprised of a plurality of separate memory devices, writes a plurality of consecutive pixel data among the color signals input by the color signal write address into each of the memory devices, and reads the plurality of consecutive pixel data from each of the memory devices on the basis of the position to be interpolated by the color signal read address. The luminance interpolating filter performs interpolation in the determined interpolating position in response to a plurality of luminance filter coefficients selected by a plurality of consecutive luminance pixel data output from the luminance signal processing unit and the pixel offset. The color signal interpolating filter performs interpolation in the determined interpolating position in response to a plurality of color signal filter coefficients selected by a plurality of consecutive color signal pixel data output from the color signal processing unit and the pixel offset.

In accordance with another aspect of the invention, there is provided a method for realizing panorama/waterglass functions. The method includes the steps of (a) generating a scaling ratio function for panorama/waterglass functions using externally applied starting ratio data, ending ratio data, and ratio declination data and determining a position to be interpolated in response to the scaling ratio function, (b) generating write and read addresses for luminance/color signals and a pixel offset on the basis of an interpolating position determined by the scaling ratio function, (c) writing a plurality of consecutive pixel data for the luminance/color signals into each of first-in first-out memories (FIFOs) using the write address, (d) reading the plurality of consecutive pixel data from each of the FIFOs on the basis of the determined interpolating position and writing the consecutive pixel data into each of the FIFOs using the write address if predetermined data are accumulated on each of the FIFOs, and (e) performing interpolation in a position to be interpolated by the read pixel data of the luminance/color signals and each of filter coefficients of the luminance/color signals.

According to the present invention, in order to write a plurality of consecutive pixel data into memory devices, and simultaneously to read the plurality of consecutive pixel data from memory devices, the consecutive pixel data are separated into a plurality of first-in first-out (FIFO) buffers having a small size, thereby minimizing the size of a memory. Further, an identical clock signal is used, and the separated FIFOs are used when the consecutive pixel data are written to the memory devices and read from the memory devices, thereby simplifying memory control such as address control. Further, when realizing panorama/waterglass functions, the scaling ratio function is variably set, thereby variably realizing memories having sizes which vary according to the scaling ratio function.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIGS. 1A through 1C illustrate the variation in image signals when realizing a conventional panorama function.

FIG. 2 is a block diagram of a conventional image processing apparatus for realizing panorama/waterglass functions.

DETAILED DESCRIPTION OF THE INVENTION

The present invention will be described more fully hereinafter with reference to the accompanying drawings in which preferred embodiments of the invention are shown.

Figure 3:
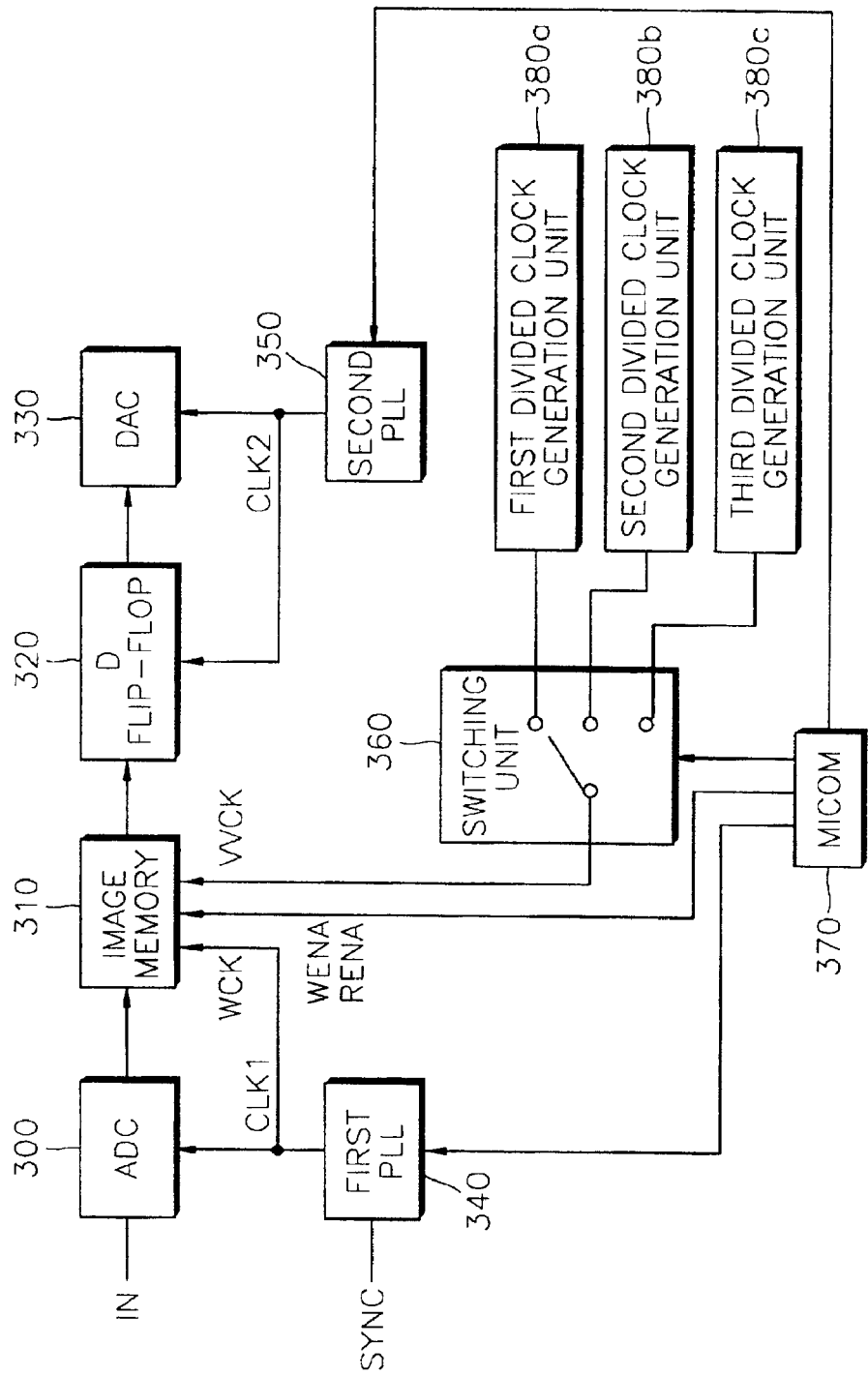
FIG. 3 is another block diagram of a conventional image processing apparatus for realizing panorama/waterglass functions.
Figure 4:
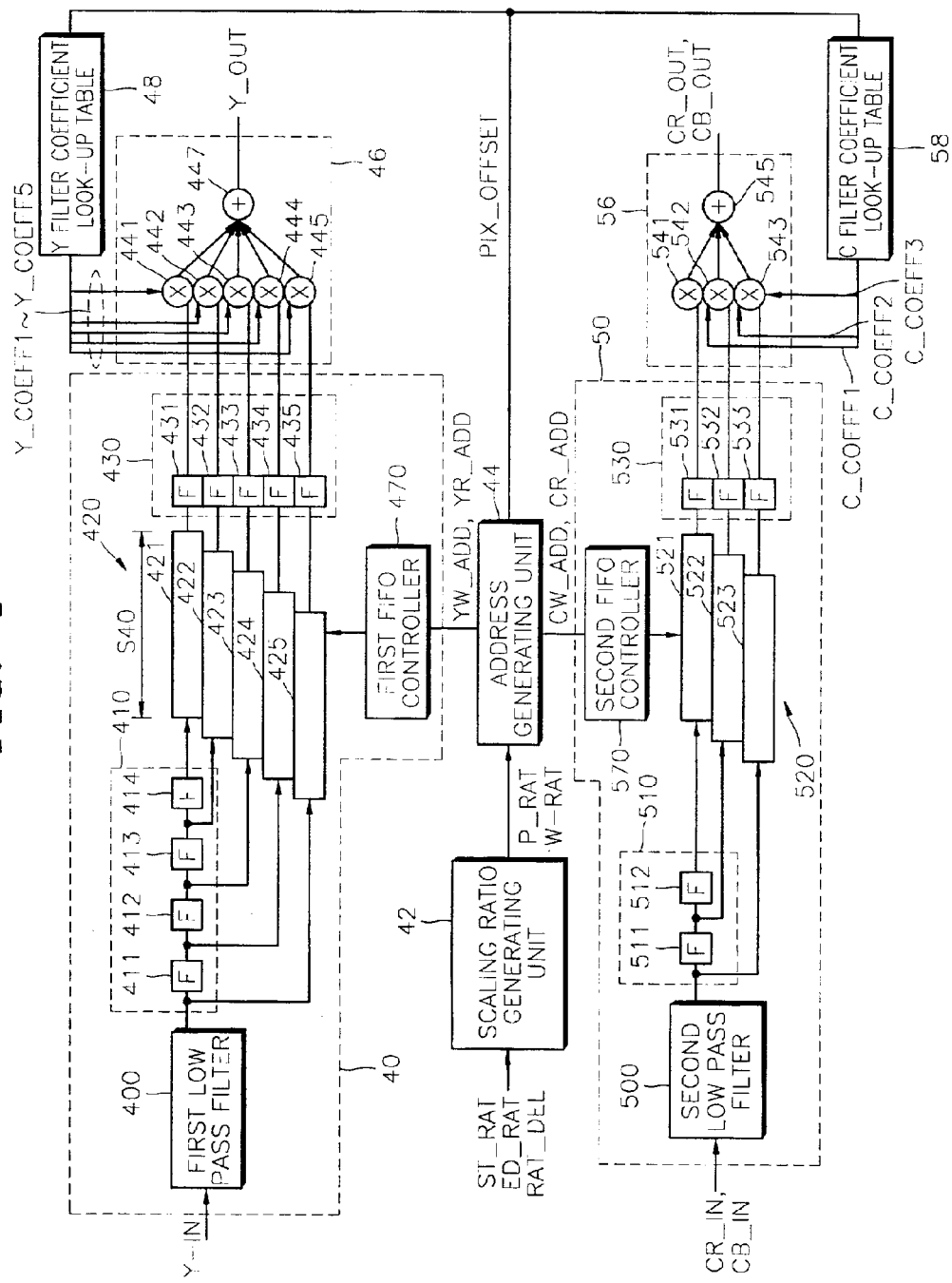
FIG. 4 is a circuit diagram of an image processing apparatus for realizing panorama/waterglass functions according to an embodiment of the present invention.

Referring to FIG. 4, the image processing apparatus includes a scaling ratio generating unit 42, an address generating unit 44, a luminance signal processing unit 40, a luminance signal interpolating filter 46, a color signal processing unit 50, a color signal interpolating filter 56, a luminance (Y) filter coefficient look-up table 48, and a color signal (C) filter coefficient look-up table 58.

Input signals in the format of an image signal based on the comite consultatif international des radio communications (CCIR) 601 standard are applied to the image signal processing apparatus shown in FIG. 4. That is, the input image signals are comprised of luminance signal components and color signal components. For example, in a case where image signals are input into the image processing apparatus according to a pixel clock signal of 13.5 MHz, the input image signals are separated into 8-bit luminance signals Y and 8-bit color signals CB and CR, and thus may be applied to 16-bit image signals. Further, in a case where image signals are input into the image processing apparatus according to a pixel clock signal of 27 MHz, the input image signals may be applied to 8-bit image signals in which luminance signals are mixed with color signals. In this case, image signals are separated into luminance signals and color signals at an input terminal. In both cases, luminance signals input to a circuit shown in FIG. 4 are marked Y_IN, and color signals input to the circuit are marked CR_IN and CB_IN. CR and CB are color signals in which R/G/B (red, green, and blue) signals are converted by a predetermined parameter.

The scaling ratio generating unit 42 shown in FIG. 4 generates horizontal scaling ratio functions P_RAT and W_RAT for panorama/waterglass functions in response to externally applied variables related to scaling, for example, starting ratio data ST_RAT, ending ratio data ED_RAT, and ratio declination data RAT_DEL. The scaling ratio functions P_RAT and W_RAT may be varied by input variables related to scaling. The scaling ratio generating unit 42 determines a horizontal re-sampling position, that is, a position to be interpolated, by using the generated scaling ratio functions. The scaling ratio generating unit 42 includes a register in which it stores a plurality of variables which are generated so as to determine an interpolating position. The scaling ratio functions P_RAT and W_RAT may depend on a panorama or waterglass function of the image processing apparatus shown in FIG. 4. In an embodiment shown in FIG. 4, the scaling ratio function in a panorama function is marked P_RAT, and the scaling ratio function in a waterglass function is marked W_RAT. The scaling ratio functions in each function will be described below in detail with reference to FIG. 6.

Referring to FIG. 4, the address generating unit 44 generates a write address YW_ADD and a read address YR_ADD of luminance signals Y, and a write address CW_ADD and a read address CR_ADD of color signals CR and CB in response to the scaling ratio functions P_RAT and W_RAT generated in the scaling ratio generating unit 42. Further, the address generating unit 44 generates a pixel offset PIX_OFFSET for restoring pixels in an arbitrary interpolating position while generating the read addresses of the luminance signals and the color signals.

The luminance signal processing unit 40 includes a first memory 420 comprised of a plurality of first-in first-out units (FIFOs) and writes a plurality of consecutive pixel data of luminance signals Y_IN into each of the FIFOs in response to the luminance write address YW_ADD. Further, the luminance signal processing unit 40 reads the plurality of consecutive pixel data from each of the FIFOs according to a pixel to be interpolated using the luminance read address YR_ADD. To perform this operation, the luminance signal processing unit 40 includes a first low pass filter 400, a first delay unit 410, a first FIFO memory 420, a first latch unit 430, and a first FIFO controller 470.

The structure and function of the luminance signal processing unit 40 will be described below in detail. The first low pass filter 400 passes low frequency components of the input luminance signals Y_IN and removes high frequency components, thereby preventing an aliasing phenomenon. The first delay unit 410 is comprised of a plurality of flip-flops 411, 412, 413, and 414 connected in series. Five consecutive pixel data, which are a pixel distant from one another, are output from the first low pass filter 400 and from each of the flip-flops 411, 412, 413, and 414. Likewise, the consecutive luminance signal pixel data, which are a pixel distant from one another, are input into the FIFOs 425 through 421 of the first FIFO memory 420, respectively.

The first FIFO memory 420 is comprised of a predetermined number of FIFOs, for example five FIFOs 421 through 425, and the five consecutive pixel data are stored in each of the FIFOs 421 through 425 corresponding to the luminance write address YW_ADD. The first FIFO memory 420 simultaneously outputs a plurality of consecutive pixel data corresponding to the luminance read address YR_ADD. The data stored in the FIFO 425 includes the data output from the first low pass filter 400 and non-delayed pixel data. Further, data stored in the FIFOs 424 through 421 are output signals of each of the flip-flops 411 through 414.

Although not specifically shown, each of the FIFOs 421 through 425 of the first FIFO memory 420 uses an identical clock signal when writing and reading data. The first FIFO controller 470 enables or disables a clock signal for reading data in response to the luminance read address YR_ADD generated in the address generating unit 44. For example, for a pixel in a position corresponding to the read address YR_ADD, the clock signal is enabled. In other cases, the clock signal is disabled. The consecutive data stored in each of the FIFOs 421 through 425 of the first FIFO memory 420 are latched by each of latches 431 through 436 of the first latch unit 430 and output.

The luminance filter coefficient look-up table 48 stores a plurality of luminance filter coefficients and selects and outputs luminance filter coefficients Y_COEFF corresponding to a pixel offset PIX_OFFSET generated in the address generating unit 44. The selected luminance filter coefficients Y_COEFF are input to the luminance interpolating filter 46. First through fifth luminance filter coefficients Y_COEFF1~Y_COEFF5 having different values corresponding to the input pixel offset PIX_OFFSET are selected in one embodiment of the present invention.

The luminance signal interpolating filter 46 performs interpolation in a predetermined position by using the consecutive pixel data output from the first FIFO memory 420 and the luminance filter coefficients Y_COEFF1~Y_COEFF5 output from the luminance filter coefficient look-up table 48. In this case, preferably, an interpolating filter may be implemented by a plurality of steps, for example, a 5-step polyphase filter. In order to interpolate luminance signals, the luminance signal interpolating filter 46 includes five multipliers 441 through 445 and an adder 447. The multipliers 441 through 445 multiply the output signals of the latches 431 through 435, respectively, of the first latch unit 430 with the luminance coefficients Y_COEFF1~Y_COEFF5, respectively, output from the luminance coefficient look-up table 48 and output results of multiplication. The adder 447 adds the signals output from each of the multipliers 441 through 445 and generates an interpolated luminance signal Y_OUT.

The color signal processing unit 50 includes a second memory 520 comprised of a plurality of FIFOs and writes a plurality of consecutive pixel data of the input color signals CR_IN and CB_IN into each of the FIFOs in response to the color signal write address CW_ADD. Further, the color signal processing unit 50 reads the plurality of consecutive pixel data from each of the FIFOs according to a pixel to interpolate the pixel data by using the color signal read address CR_ADD. For this operation, the color signal processing unit 50 includes a second low pass filter 500, a second delay unit 510, a second FIFO memory 520, a second latch unit 530, and a second FIFO controller 570.

The structure and function of the color signal processing unit 50 will be described below in detail. The second low pass filter 500 filters low-pass components of the input color signals CR_IN and CB_IN, thereby preventing an aliasing phenomenon. The second delay unit 510 is comprised of a plurality of flip-flops 511 and 512 connected in series. Three consecutive pixel data at the interval of a pixel are output from the second low pass filter 500 and from each of the flip-flops 511 and 512. Likewise, the consecutive pixel data at the interval of a pixel are input into the FIFOs 523 through 521 of the first FIFO memory 520, respectively.

The second FIFO memory 520 is comprised of three FIFOs 521 through 523, and the three consecutive pixel data are stored in each of the FIFOs 521 through 523 corresponding to the color signal write address CW_ADD. The second FIFO memory 520 simultaneously outputs three consecutive pixel data corresponding to the color signal read address CR_ADD. The second FIFO controller 570 enables or disables a clock signal for reading color signal pixel data in response to the color signal read address CR_ADD generated in the address generating unit 44. Data output from each of FIFOs 521 through 523 of the second FIFO memory 520 are latched by each of latches 531 through 533 of the second latch unit 430 and output.

The color signal filter coefficient look-up table 58 stores a plurality of color signal filter coefficients and selects and outputs color signal filter coefficients C_COEFF corresponding to a pixel offset PIX_OFFSET generated in the address generating unit 44. The color signal filter coefficients C_COEFF denote first through third filter coefficients C_COEFF1~C_COEFF3 having different values.

The color signal interpolating filter 56 performs interpolation in a predetermined position using the three consecutive pixel data output from the second FIFO memory 520 and the color signal filter coefficients C_COEFF1~C_COEFF3 output from the color signal filter coefficient look-up table 58. In this case, preferably, an interpolating filter may be implemented by 3-step polyphase filter. The color signal interpolating filter 56 includes multipliers 541 through 543 and an adder 545. The multipliers 541 through 543 multiply the output signals of the latches 531 through 533, respectively, of the second latch unit 530 with the color signal coefficients C_COEFF1~C_COEFF3, respectively, output from the color signal coefficient look-up table 58 and outputs the results of multiplication. The adder 545 adds the signals output from each of the multipliers 541 through 543 and generates interpolated color signals CR_OUT and CB_OUT.

In the embodiment shown in FIG. 4, the luminance signal interpolating filter 46 is implemented by 5-step multiplication, and the color signal interpolating filter 56 is implemented by 3-step multiplication. This is the reason why variation in the luminance signals is larger than the color signals, and the number of steps of the luminance signals is increased such that a screen appears normal.

Figure 5:
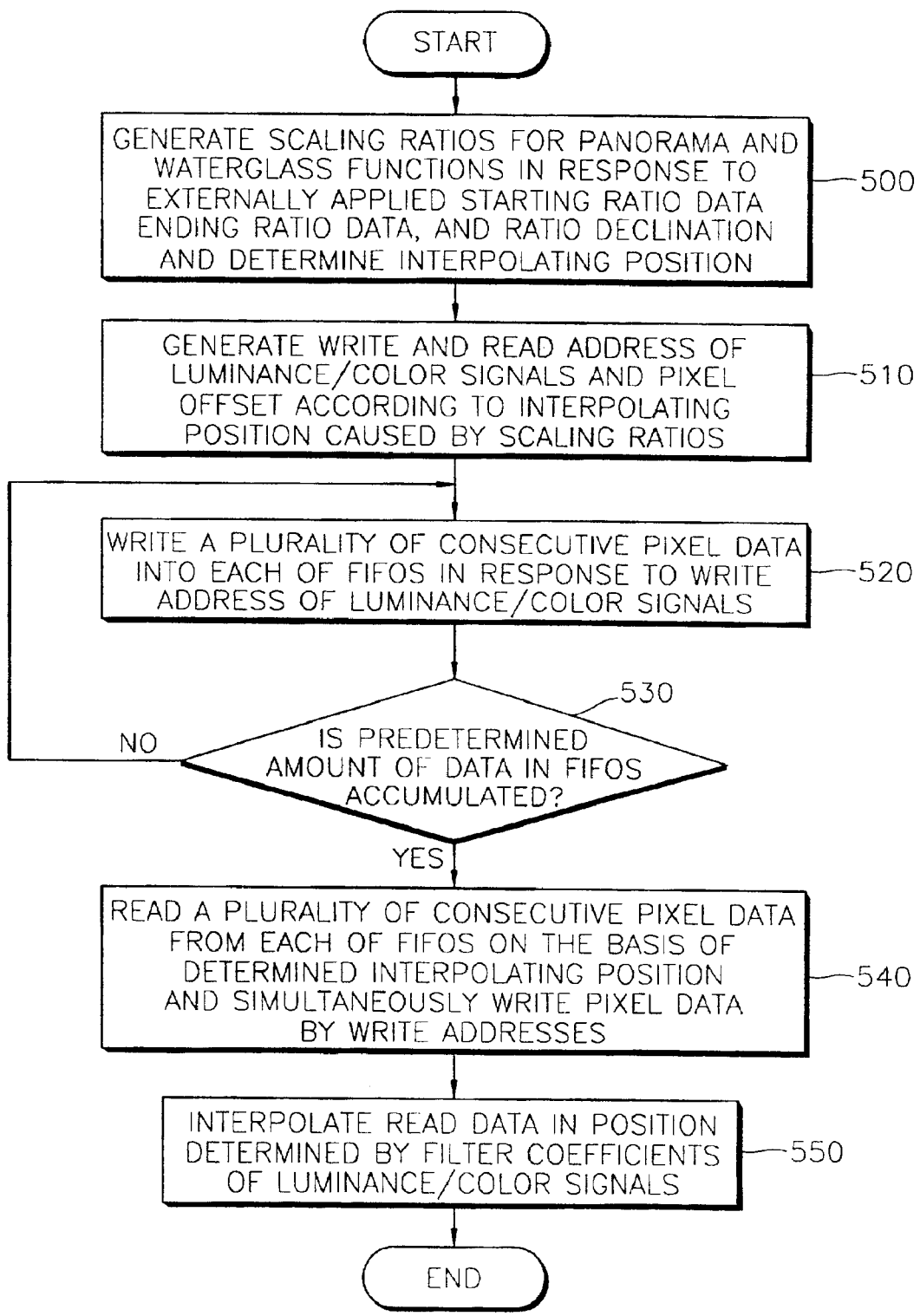
FIG. 5 is a flowchart illustrating a method for realizing panorama/waterglass functions used by the image processing apparatus shown in FIG. 4.

FIG. 5 is a flowchart for illustrating a method for realizing panorama/waterglass functions used by the image processing apparatus shown in FIG. 4.

Hereinafter, the operation and method of the image processing apparatus for realizing panorama/waterglass functions according to the embodiment of the present invention will be described in detail with reference to FIGS. 4 and 5. In step 500, the scaling ratio generating unit 42 shown in FIG. 4 generates the scaling ratio functions P_RAT and W_RAT for panorama/waterglass functions in response to external variables set by users, that is, starting ratio data ST_RAT, ending ratio data ED_RAT, and ratio declination data RAT_DEL and determines an interpolating position corresponding to the variables.

Figure 6A:
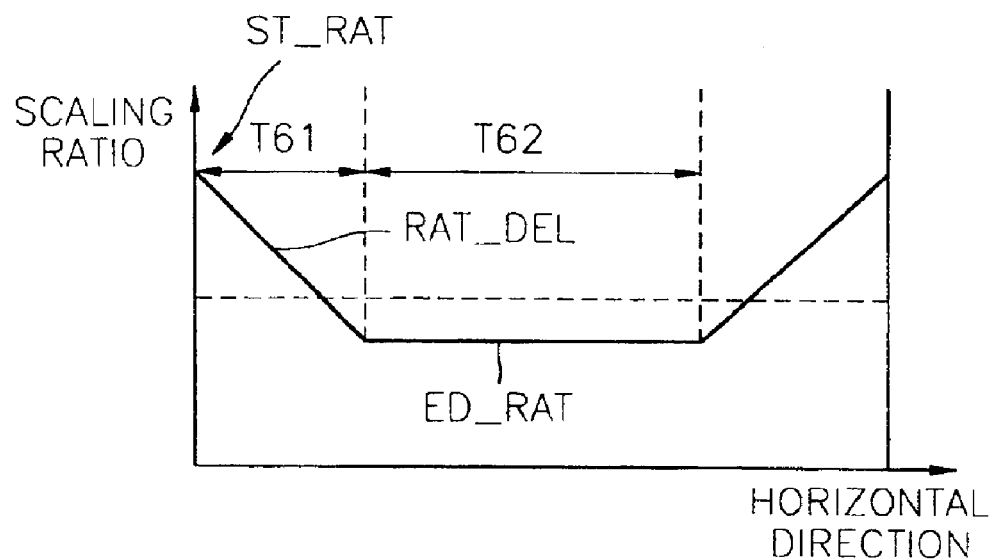
FIGS. 6A and 6B illustrate scaling ratio functions when panorama/waterglass functions of the image processing apparatus shown in FIG. 4 are realized.
Figure 6B:
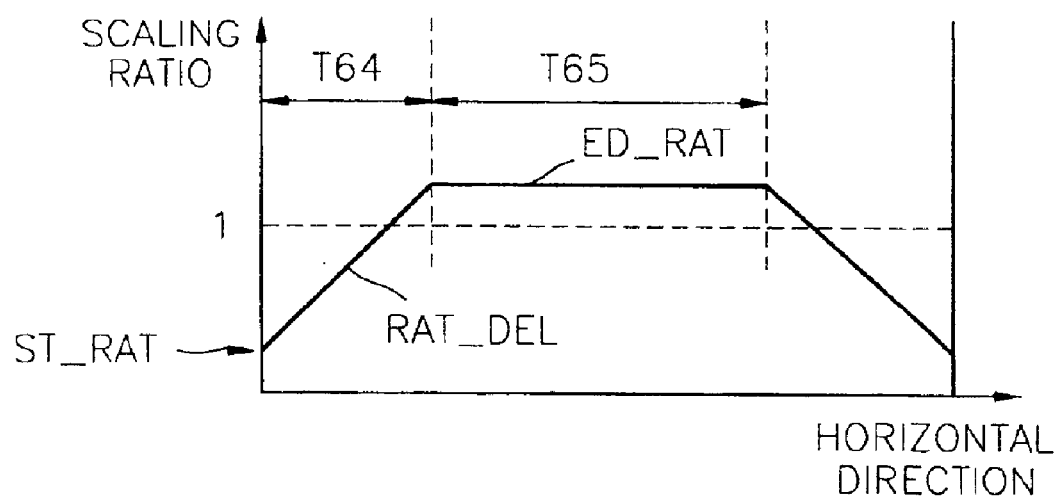

FIGS. 6A and 6B illustrate scaling ratio functions when panorama/waterglass functions of the image processing apparatus shown in FIG. 4 are realized. As described above, the edges of a screen are increased, and the middle of the screen is reduced when realizing a panorama function. Thus, referring to FIG. 6A, the starting ratio data ST_RAT are set to 1 or more in the horizontal direction of the screen, and the scaling ratio of the starting ratio data ST_RAT is gradually reduced during an interval T61, like the ratio declination data RAT_DEL. Further, the scaling ratio of the starting ratio data ST_RAT is set to three fourths during an interval T62 in the middle of the screen, and thus the screen is reduced. In such a case, the scaling ratio of the starting ratio data ST_RAT at the intervals T61 and T62 represents a symmetric structure on the basis of the central axis of horizontal intervals. Thus, for convenience of explanation, the scaling ratio of the starting ratio data ST_RAT at the interval T62 is set to the ending ratio ED_RAT.

In the case of the scaling ratio function when realizing a waterglass function, as shown in FIG. 6B, contrary to a panorama function, the scaling ratio at the edges of the screen is reduced, and the scaling ratio in the middle of the screen is increased. Thus, referring to FIG. 6B, the starting ratio data ST_RAT are set to be smaller than 1 in the horizontal direction of the screen, and thus, the scaling ratio of the starting ratio data ST_RAT is gradually increased by variation in the ratio declination data RAT_DEL during an interval T64. Further, the scaling ratio of the starting ratio data ST_RAT is set to four thirds during an interval T65, and thus, the screen is increased. In such a case, the scaling ratio of the starting ratio data ST_RAT at the interval T65 is set to the ending ratio ED_RAT for the convenience of explanation. That is, in the present invention, only variables related to scaling shown in FIG. 4 are changed, thereby realizing both the panorama function shown in FIG. 6A and waterglass function shown in FIG. 6B.

In this way, if the scaling ratios are determined on the basis of realizing each of panorama and waterglass functions, interpolation is performed so as to recover image data in an arbitrary position according to the determined scaling ratio.

Figure 7:
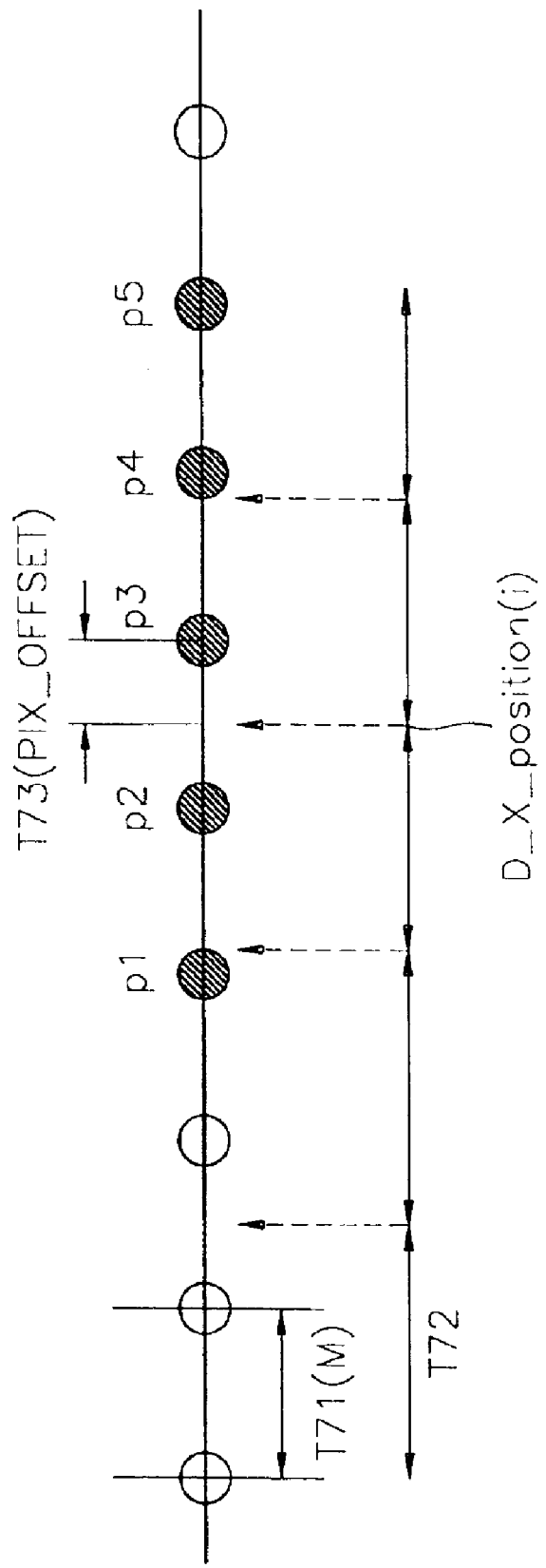
FIG. 7 illustrates a pixel interpolating position of the image processing apparatus shown in FIG. 4.

Referring to FIG. 7, the position to be interpolated is between p2 and p3, and pixels to be used for interpolation are right and left adjacent pixels p1, p2, p3, p4, and p5 based on an interpolating position x. Likewise, data of 5 adjacent right and left pixels in the case of luminance signals or 3 pixels in the case of color signals based on the interpolating position are used for interpolation.

In FIG. 7, an interval T71 denotes an interval between normal pixels, and the interval is marked M. An interval T72 denotes an interval between pixels in a position where interpolation is performed, and an interval T73 denotes a pixel offset PIX_OFFSET. Determination by the scaling ratio generating unit 42 of the interpolating position shown in FIG. 7 according to the scaling ratios will be described in detail with reference to FIG. 8.

Figure 8A:
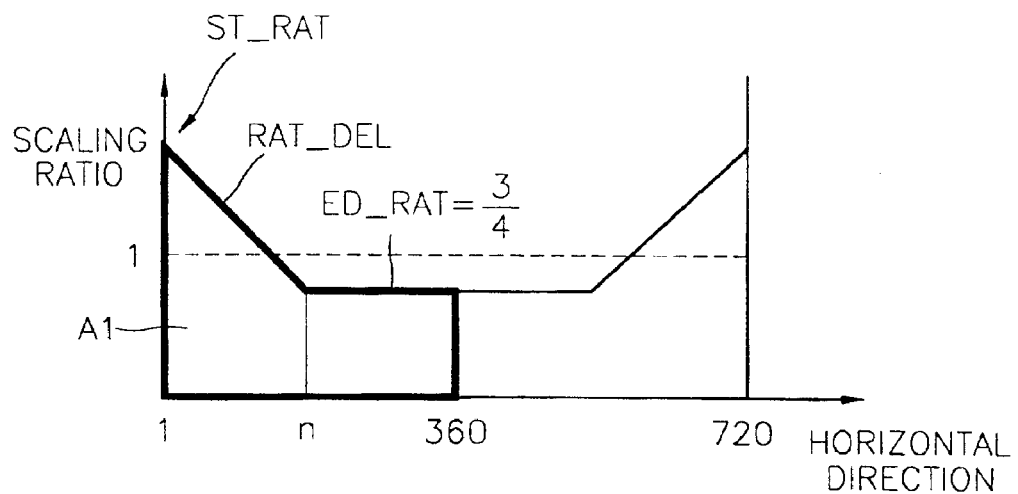
FIGS. 8A and 8B illustrate steps of generating an interpolating position and addresses of the image processing apparatus shown in FIG. 4.
Figure 8B:
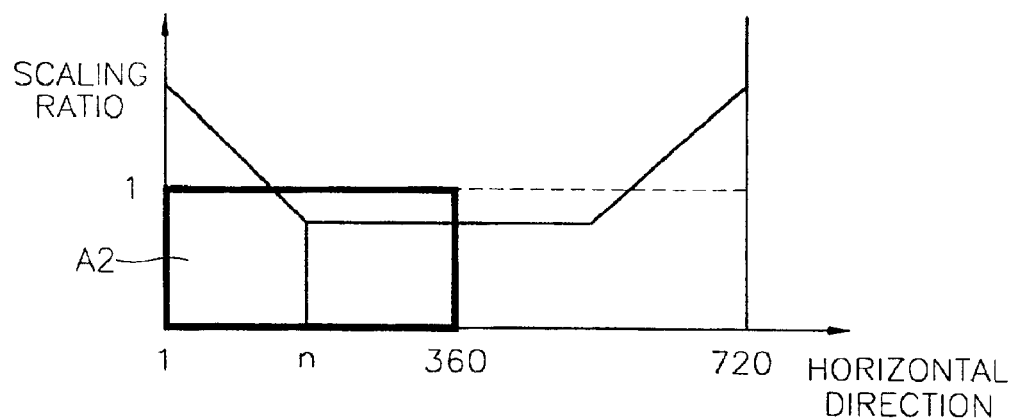

FIGS. 8A and 8B illustrate steps of generating an interpolating position and addresses of the image processing apparatus shown in FIG. 4. In FIG. 8A, assuming that the number of horizontal pixels is 720, a horizontal direction is represented symmetrical in the right and left directions with respect to the center. Thus, in order to determine an interpolating position, 360 pixels are considered. Referring to FIG. 8A, the area of a portion in which the scaling ratio functions are shown is marked A1 in consideration of the number of horizontal pixels from 1 to 360. Since 720 pixels of a conventional TV having the ratio of 4:3 should be included in a screen of a wide TV having the ratio 16:9, the horizontal area A2 of the wide TV shown in FIG. 8B should be the same as the area A1 shown in FIG. 8A obtained by the scaling ratio functions. Likewise, assuming that the area A1 shown in FIG. 8A is the same as the area A2 shown in FIG. 8B, Equation 1 is obtained.

$$360 * M = (360 - n) * ED\_RAT + \qquad \text{[Equation 1]}$$

-continued $$\int_{}^{n}(-\text{RAT\_DEL}*x+\text{ST\_RAT})dx$$

Here, M is an interval between normal pixels, and n is a position of a pixel in the middle of a screen where the scaling ratio declines and becomes constant. An interpolating position may be expressed by Equation 2.

$$\begin{aligned}\text{x\_position}(i+1) &= \text{x\_position}(i) + \\ &\quad (-\text{RAT\_DEL}*x) + \\ &\quad \text{ST\_RAT}, ODx < n\end{aligned}$$ [Equation 2]

$$\begin{aligned}\text{x\_position}(i+1) &= \text{x\_position}(i) + \\ &\quad (-\text{RAT\_DEL}*x) + \\ &\quad (M*\text{ED\_RAT}), nDx < 360\end{aligned}$$

Here, referring to Equation 2 and FIG. 7, i is a position to be interpolated, and x is the number of horizontal pixels. That is, an interpolating position in a case where x is less than n in Equation 2 is different from a case where x is more than n in Equation 2.

In this way, if the interpolating position is determined in step 500 shown in FIG. 5, the address generating unit 44 shown in FIG. 4 generates write and read addresses of luminance/color signals and a pixel offset PIX_OFFSET in step 510. The write addresses of luminance/color signals are sequentially generated so as to sequentially write each of the input color signals and luminance signals. The read addresses YR_ADD and WR_ADD for reading pixel data from each of the first and second FIFO memories 420 and 520 are expressed by Equation 3 in consideration of the interpolating position in a horizontal direction.

$$R\_ADD = \text{int}(x\_\text{position}(i)/M)$$ [Equation 3]

Here, R_ADD may be the read address YR_ADD of the luminance signals and the read address CR_ADD of the color signals. That is, the read address is a value in which an integer part is taken from a value in which an interpolating position x_position(i) is divided into an interval M of a normal pixel. The pixel offset PIX_OFFSET generated in the address generating unit 44 may be expressed by Equation 4.

$$\text{PIX\_OFFSET} = x\_\text{position}(i)\%M$$ [Equation 4]

That is, the pixel offset PIX_OFFSET is a value in which the remainder, that is, a decimal part, is taken from a value in which the interpolating position x_position (i) is divided into an interval M of a pixel, compared with Equation 3. As described above, the pixel offset PIX_OFFSET is applied to the filter coefficient look-up table 440 and 540 and used to select filter coefficients.

In step 520, a plurality of consecutive pixel data are written into each of the first and second FIFO memories 420 and 520 in response to the write addresses YW_ADD and CW_ADD of luminance/color signals of addresses generated in the address generating unit 44 in step 510. In order to interpolate image data in the interpolating position initially determined, data of 5 adjacent right and left pixels (in the case of luminance signals) or 3 pixels (in the case of color signals) based on the interpolating position should be read from each of the first and second FIFO memories 420 and 520. That is, luminance signals in the first FIFO memory 420 and color signals in the second FIFO memory 520 stored by each of the read addresses obtained in Equation 3 are read from each of the first and second FIFO memories 420 and 520. However, reading of data is variably performed according to the scaling ratio unlike data write speed, and thus data read speed is not constant. Accordingly, reading of data is performed after writing of data is performed to a certain degree. That is, writing of data is performed in step 520, and in step 530, it is determined whether a predetermined amount of data is accumulated in the first and second FIFO memories 420 and 520. If it is determined that the predetermined amount of data is not accumulated in the first and second FIFO memories 420 and 520, step 620 is repeatedly performed until the data are accumulated in the first and second FIFO memories 420 and 520. If the predetermined amount of data is accumulated in the FIFO memories 420 and 520, reading/writing of data are simultaneously performed at different speeds. That is, in step 540, the plurality of consecutive pixel data are read by the read addresses YR_ADD and CR_ADD from each of the first and second FIFO memories 420 and 520 and are simultaneously written by the write addresses YW_ADD and CW_ADD into each of the first and second FIFO memories 420 and 520 on the basis of the interpolating position determined in step 500.

In this way, in performing a panorama or waterglass function, the speed at which data are input to the first and second FIFO memories 420 and 520 is constant. However, data output speed continuously varies, because the read addresses are variably set according to the interpolating position based on the scaling ratio function.

Figure 9:
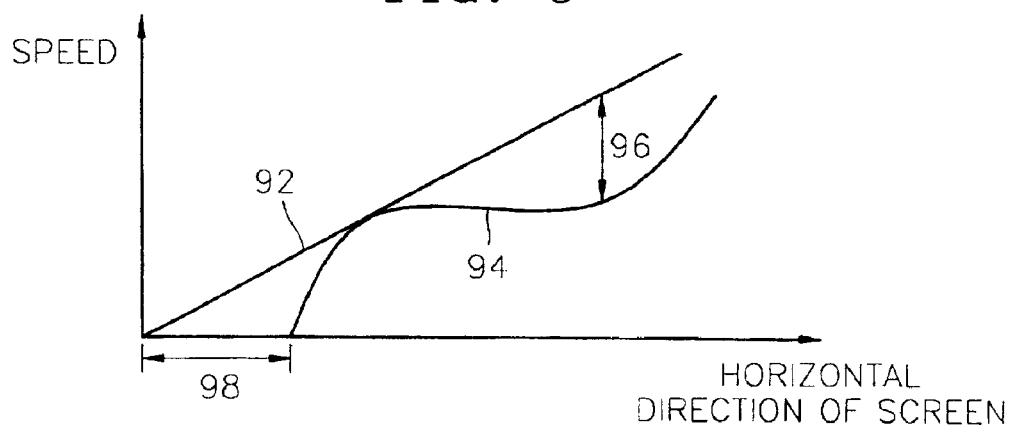
FIG. 9 illustrates a comparison of the speed at which data are input and output to and from the memory of the image processing apparatus shown in FIG. 4.

Referring to FIG. 9, reference numerals 92 and 94 denote data input speed and data output speed. That is, writing of data in a horizontal direction of a screen is performed at constant speed. On the other hand, compared with the data input speed 92, the data output speed 94 first increases by the scaling ratio, flattens out in the middle, and then increases again. Since the predetermined amount of data is accumulated in the first and second FIFO memories 420 and 520, and then reading of data begins, reading of data is performed after a delay such as that shown by reference numeral 98. Reference numeral 96 denotes an interval where there is the largest difference between data input speed and data output speed, that is, an interval where there is the slowest data output speed. Thus, the maximum size (S40 of FIG. 4) of the first and second FIFO memories 420 and 520 is determined by the interval 96. Likewise, the size of each of the FIFOs of the first and second FIFO memories 420 and 520 is set in consideration of a time when there is the largest difference between data input speed and data output speed. Thus, preferably, a size greater than the size of a memory indicated by reference numeral 96 is implemented such that the memory is not in a full state when the first and second memories 420 and 520 are realized. In general, each of the FIFOs of the first and second FIFO memories 420 and 520 is implemented in the range of 128~256 bytes. The size of total memories required to realize panorama/waterglass functions of the present invention is obtained below. For example, the size of 1024 bytes in which 128×5 bytes for luminance signals are added to 128×3 bytes for color signals are required when using the FIFO having 128 bytes. Further, a size of 2048 bytes, in which 256×5 bytes for luminance signals are added to 256×3 bytes for color signals, is required when using the FIFO having 256 bytes. The size of a memory may be variably implemented by the scaling ratio function. However, in general, the size of a memory according to the present invention may be much smaller than the size of a memory required in a conventional circuit.

Referring back to FIG. 5, if reading of data is performed in step 540, the read data are interpolated in the position determined by the filter coefficients Y_COEFF and C_COEFF of luminance/color signals in step 550. As described above, the luminance interpolating filter 46 and the color signal interpolating filter 56 multiply the pixel data output from each of the FIFOs of the first and second FIFO memories 420 and 520 with the filter coefficients, respectively, and add the results of multiplication to each other, thereby performing interpolation. In such a case, the luminance filter coefficient table 48 for selecting the luminance filter coefficients Y_COEFF according to offset PIX_OFFSET is described in Table 1.

TABLE 1

| PIX_OFFSET | Y_COEFF1 | Y_COEFF2 | Y_COEFF3 | Y_COEFF4 | Y_COEFF5 |
|---|---|---|---|---|---|
| 0 | 0 | 0 | 64 + 2 | 64 − 1 | −1 |
| 1 | 0 | 0 | 64 + 4 + 1 | 64 − 2 − 1 | −2 |
| 2 | 0 | 1 | 64 + 8 − 1 | 64 − 8 − 2 | −2 |
| 3 | −1 | 1 | 64 + 8 + 4 | 64 − 8 − 1 | −2 − 1 |
| 4 | −1 | 2 | 64 + 16 − 2 | 32 + 16 + 4 | −2 − 1 |
| 5 | −1 | 2 + 1 | 64 + 16 | 32 + 16 + 1 | −2 − 1 |
| 6 | −1 | 4 | 64 + 16 + 2 | 32 + 16 − 2 | −2 − 1 |
| 7 | −1 | 4 + 2 | 64 + 16 + 2 | 32 + 8 + 4 | −2 − 1 |
| 8 | −1 | 8 − 1 | 64 + 16 + 4 | 32 + 8 + 1 | −2 − 1 |
| 9 | −1 | 8 | 64 + 16 + 4 + 2 | 32 + 4 + 2 | −2 − 1 |
| A | −1 | 8 + 2 | 64 + 16 + 8 − 1 | 32 + 2 + 1 | −2 − 1 |
| B | −2 | 8 + 4 | 64 + 16 + 8 + 1 | 32 | −2 − 1 |
| C | −2 | 16 − 2 | 64 + 16 + 8 + 2 | 32 − 2 − 1 | −2 − 1 |
| D | −2 | 16 | 64 + 16 + 8 + 2 | 32 − 4 − 1 | −2 − 1 |
| E | −2 | 16 + 2 | 64 + 16 + 8 + 2 + 1 | 16 + 8 | −2 − 1 |
| F | −2 | 16 + 4 | 64 + 16 + 8 + 2 | 16 + 4 + 2 | −2 |

In Table 1, the pixel offset PIX_OFFSET illustrates a case where an interval M between pixels are divided by thirty two. When exceeding PIX_OFFSET F, coefficients are repeatedly represented in the coefficients from 0 to F, so only the coefficients from 0 to F are represented.

Further, the color signal filter coefficient look-up table 58 for selecting the color signal filter coefficients C_COEFF according to the pixel offset PIX_OFFSET is described in Table 2.

TABLE 2

| PIX_OFFSET | C_COEFF1 | C_COEFF2 | C_COEFF3 |
|---|---|---|---|
| 0 | 0 | 16 + 2 | 16 − 2 |
| 1 | 0 | 16 + 4 + 2 | 8 + 2 |
| 2 | 0 | 16 + 8 + 2 | 4 + 2 |
| 3 | 1 | 32 − 4 | 2 + 1 |

In Table 2, the pixel offset PIX_OFFSET illustrates a case where each pixel and an interval M between pixels are divided by eight. When exceeding PIX_OFFSET 3, are repeatedly represented in the coefficients from 0 to 3, so only the from 0 to 3 are represented.

As described above, a plurality of separate memories having small sizes are used in the present invention, and an identical clock signal is used for writing/reading data, thereby simplifying memory control According to the present invention, in order to simultaneously write and read a plurality of consecutive pixel data, the consecutive pixel data are separated into a plurality of FIFOs having small sizes, thereby minimizing the size of memories. Further, an identical clock signal is used in writing and reading data, and the separate FIFOs are used, thereby simplifying memory control such as address control. Further, the scaling ratio functions are variably set when realizing panorama and waterglass functions, and thus the size of memories can be variably realized.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An image processing apparatus for realizing panorama/waterglass functions, the apparatus comprising:

a scaling ratio generating unit for generating a horizontal scaling ratio function for realizing panorama/waterglass functions in response to variables including an externally applied starting ratio data, ending ratio data, and ratio declination data and determining a position to be interpolated in response to the scaling ratio function;

an address generating unit for generating luminance write/read addresses and color signal write/read addresses using the scaling ratio function and the position to be interpolated and generating a pixel offset in response to the luminance read address and the color signal read address;

a luminance signal processing unit including a first memory comprised of a plurality of separate memory devices, for writing a plurality of consecutive pixel data among the luminance signals input by the luminance write address into each of the memory devices, and reading the plurality of consecutive pixel data from each of the memory devices on the basis of the position to be interpolated by the luminance read address;

a color signal processing unit including a second memory comprised of a plurality of separate memory devices, for writing a plurality of consecutive pixel data among the color signals input by the color signal write address into each of the memory devices, and reading the plurality of consecutive pixel data from each of the memory devices on the basis of the position to be interpolated by the color signal read address;

a luminance interpolating filter for performing interpolation in the determined interpolating position in response to a plurality of luminance filter coefficients selected by a plurality of consecutive luminance pixel data output from the luminance signal processing unit and the pixel offset; and a color signal interpolating filter for performing interpolation in the determined interpolating position in response to a plurality of color signal filter coefficients selected by a plurality of consecutive color signal pixel data output from the color signal processing unit and the pixel offset.

2. The apparatus of claim 1, wherein the first and second memories are comprised of different numbers of first-in first-out (FIFO) memories.

3. The apparatus of claim 1, wherein the scaling ratio generating unit $$x\_position(i+1) = x\_position(i) + (-RAT\_DEL * x) +$$
$$ST\_RAT, ODx < n$$

$$x\_position(i+1) = x\_position(i) + M * ED\_RAT, nDx < K$$

determines an interpolating position by the following Equation,
where x_position(i) denotes a position to be interpolated, ST_RAT denotes starting ratio data, RAT_DEL is ratio declination data, ED_RAT denotes ending ratio data, x denotes the number of horizontal pixels, n denotes a horizontal pixel position in the middle where a scaling ratio becomes constant, M denotes the interval of a normal pixel, and K denotes half of the total number of pixels.

4. The apparatus of claim 1, wherein the luminance signal processing unit comprises:
a first low pass filter for filtering low-pass components of externally input luminance signals;
a first delay unit for delaying an output signal of the first low pass filter for a predetermined time to output the delayed output signal as the consecutive luminance signal pixel data; and
a first memory controller for enabling/disabling a read clock signal applied to the first memory in response to the luminance read address generated in the address generating unit; and
wherein
data output from the first delay unit are stored in each of the memory devices of the first memory.

5. The apparatus of claim 4, wherein the luminance signal processing unit further includes a latch circuit for latching each of the pixel data output from each of the memory devices of the first memory.

6. The apparatus of claim 4, wherein the color signal processing unit comprises:
a second low pass filter for filtering low-pass components of externally input color signals;
a second delay unit for delaying an output signal of the second low pass filter for a predetermined time to output the delayed output signal as the consecutive color signal pixel data; and
a second memory controller for enabling/disabling a read clock signal applied to the second memory in response to the color signal read address generated in the address generating unit; and wherein
data output from the second delay unit are stored in each of the memory devices of the second memory.

7. The apparatus of claim 6, wherein the color signal processing unit further includes a latch circuit for latching each of the pixel data output from each of the memory devices of the second memory.

8. The apparatus of claim 1, wherein the luminance interpolating filter comprises:
a plurality of multipliers fr multiplying the plurality of luminance pixel data output from the luminance signal processing unit with the luminance filter coefficients; and an adder for adding output signals of the multipliers to output the multiplied result as the result of interpolating the luminance signals.

9. The apparatus of claim 1, wherein the luminance interpolating filter is implemented by a 5-step polyphase filter.

10. The apparatus of claim 1, wherein the color signal interpolating filter comprises:
a plurality of multipliers for multiplying the plurality of color signal pixel data output from the color signal processing unit with the color signal filter coefficients; and
an adder for adding output signals of the multipliers to output the multiplied result as the result of interpolating the color signals.

11. The apparatus of claim 1, wherein the color signal interpolating filter is implemented by a 3-step polyphase filter.

12. The apparatus of claim 1, wherein the first and second memories set the size of each of the memory devices comprising the first and second memories in consideration of a time when there is the largest difference between the speed at which data are input to the first and second memories and the speed at which the data are output from the first and second memories.

13. The apparatus of claim 1, further comprising:
a luminance filter coefficient look-up table for storing a plurality of luminance filter coefficients and selecting and outputting the luminance filter coefficients corresponding to the pixel offset; and
a color signal filter coefficient look-up table for storing a plurality of color signal filter coefficients and selecting and outputting the color signal filter coefficients corresponding to the pixel offset.

14. A method for realizing panorama/waterglass functions, the method comprising:
(a) generating a horizontal scaling ratio function for panorama/waterglass functions in response to variables including an externally applied starting ratio data, ending ratio data, and ratio declination data and determining a position to be interpolated in response to the scaling ratio function;
(b) generating luminance write/read addresses and color signal write/read addresses using the scaling ratio function and the position to be interpolated and generating a pixel offset in response to the luminance read address and the color signal read address;
(c) providing a luminance signal processing unit including a first memory comprised of a plurality of separate memory devices, for writing a plurality of consecutive pixel data among the luminance signals input by the luminance write address into each of the memory devices, and reading the plurality of consecutive pixel data from each of the memory devices on the basis of the position to be interpolated by the luminance read address;
(d) providing a color signal processing unit including a second memory comprised of a plurality of separate memory devices, for writing a plurality of consecutive pixel data among the color signals input by the color signal write address into each of the memory devices, and reading the plurality of consecutive pixel data from each of the memory devices on the basis of the position to be interpolated by the color signal read address; and (e) performing interpolation in the determined interpolation position in response to a plurality of luminance filter coefficients selected by a plurality of consecutive luminance pixel data output from the luminance signal processing unit and the pixel offset.

15. The method of claim 14, wherein the position to be interpolated is determined by dividing the scaling ratio into two portions in which the scaling ratio is varied and maintained constantly.

16. The method of claim 15, wherein the position to be interpolated is obtained by the following Equation;

$$x\_position(i+1) = x\_position(i) + (-RAT\_DEL*x) + ST\_RAT, ODx < n$$

$$x\_position(i+1) = x\_position(i) + M*ED\_RAT, nDx < K$$

where x_position(i) denotes a position to be interpolated, ST_RAT denotes starting ratio data RAT_DEL is ratio declination data, ED_RAT denotes ending ratio data, x denotes the number of horizontal pixels, n denotes a horizontal pixel position in the middle where a scaling ratio becomes constant, M denotes the interval of a normal pixel, and K denotes half of the total number of pixels.

17. The method of claim 14, wherein the read addresses of the luminance and color signals are generated by taking the integer part of a value in which the position to be interpolated is divided into the interval of normal pixel data is obtained.

18. The method of claim 14, wherein the pixel offset is generated by taking the decimal part of a value in which the position to be interpolated is divided into the interval of normal pixel data is obtained.

* * * * *

UNITED STATES PATENT AND TRADEMARK OFFICE
CERTIFICATE OF CORRECTION

PATENT NO. : 6,956,625 B2
DATED : October 18, 2005
INVENTOR(S) : Jong-dae Kim

It is certified that error appears in the above-identified patent and that said Letters Patent is hereby corrected as shown below:

Column 13,
Line 64, delete "fr" and insert -- for --.

Column 16,
Line 2, insert -- , -- after "data".

Signed and Sealed this

Eighteenth Day of April, 2006

JON W. DUDAS
*Director of the United States Patent and Trademark Office*